(No Model.)
I. VAN HAGEN.
TEA KETTLE.
No. 364,151. Patented May 31, 1887.
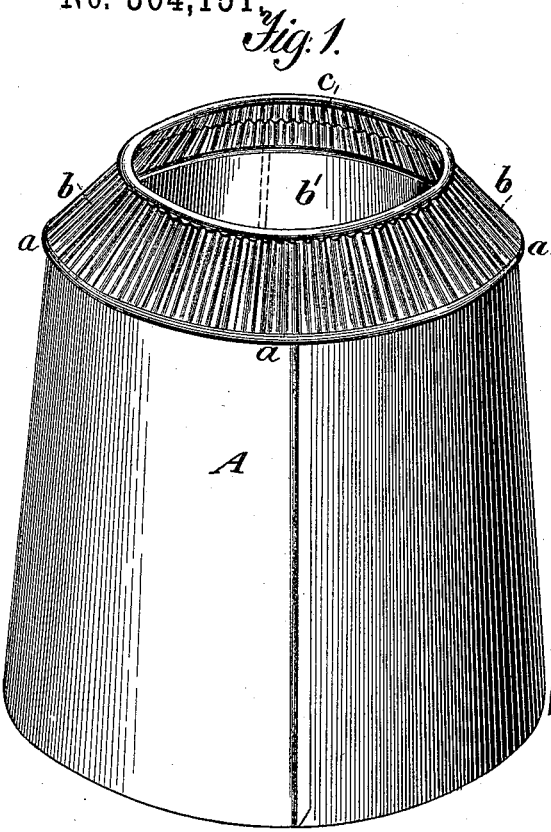
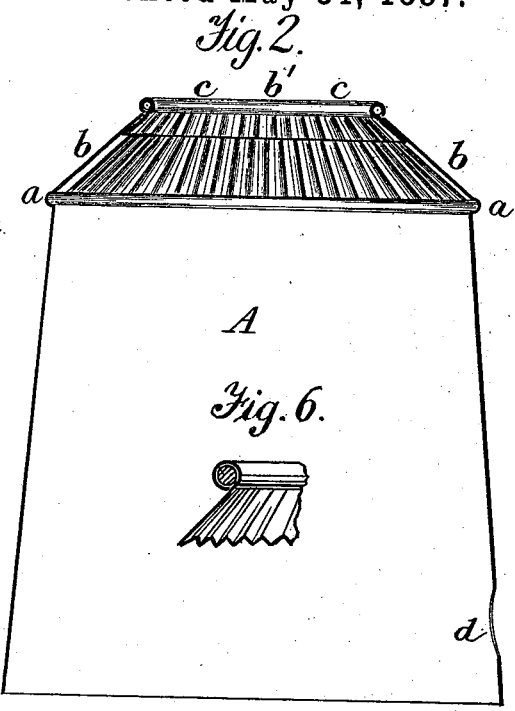
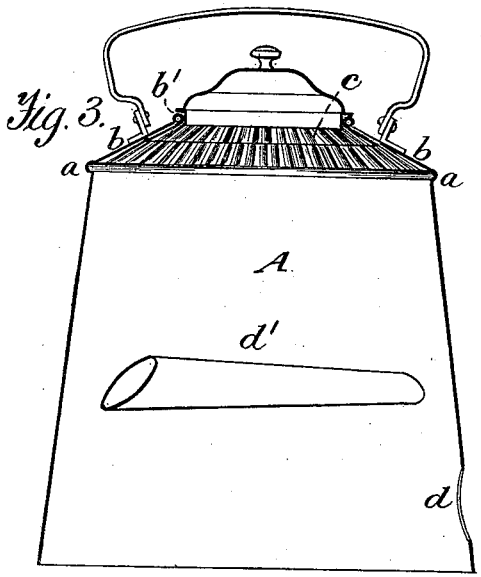
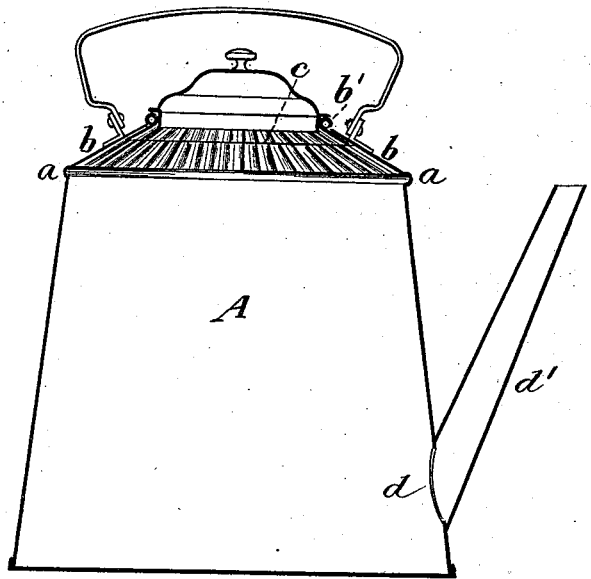
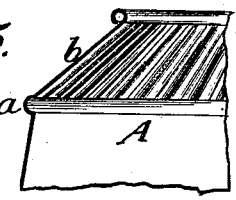
Witnesses:
A. Ruppert
E. Hickenlooper
Inventor:
Isaac Van Hagen

UNITED STATES PATENT OFFICE.

ISAAC VAN HAGEN, OF CHICAGO, ILLINOIS.

TEA-KETTLE.

SPECIFICATION forming part of Letters Patent No. 364,151, dated May 31, 1887.

Application filed August 7, 1886. Serial No. 210,314. (No model.)

*To all whom it may concern:*

Be it known that I, ISAAC VAN HAGEN, of Chicago, in the county of Cook and State of Illinois, have invented certain new and useful Improvements in Tea-Kettles or Similar Utensils, of which the following is a specification, reference being had to the accompanying drawings, and to the letters of reference marked thereon.

The special object of my invention is to form a tea-kettle body and breast in one piece, to which any suitable bottom, spout, cover, and other parts necessary to make a complete kettle may be subsequently attached or applied.

Heretofore it has been found that large manufacturers could not, by reason of the great bulk of the kettle and expense and inconvenience incident to its shipment, successfully introduce its sale into interior parts and remote towns of the country, and that in consequence the article has been principally made by local tinners, who are enabled to make it at a lower cost than it can be furnished by the larger manufacturers.

The object of my invention, therefore, is to construct the body and breast of the kettle in one piece, in a convenient form for the subsequent attachment or application thereto of the other parts necessary to make the entire utensil, which attachment or application can be readily made by local tinners, the result being the production of a better and cheaper article than has heretofore been furnished to the public living at points or towns remote from manufacturing centers.

In the accompanying drawings, Figure 1 is a perspective view of an improved tea-kettle body and breast constructed in accordance with my invention. Fig. 2 is a longitudinal vertical section of Fig. 1. Fig. 3 is a vertical section showing the body and breast, as in Fig. 1, together with the bail and cover applied, and the spout formed ready to be soldered to the body. Fig. 4 is a vertical section of the tea-kettle complete, showing the parts, as in Fig. 2, attached, and the bottom soldered on. Fig. 5 shows a modification, and Fig. 6 an enlarged detail.

Similar letters of reference indicate similar parts in the respective figures.

In carrying out my invention, I first make a body, A, straight or flaring, preferably flaring, so as to "nest" for shipment. A bead, $a$, is formed, which bead is the base of the corrugated breast portion $b$, and serves as the starting-point for the corrugations. The corrugated breast portion $b$ is formed by special machinery which I have designed for this purpose, and which will form the subject-matter of a separate application for Letters Patent. The corrugated breast portion $b$ is turned inward to the desired angle, and thus forms a strong, durable, and ornamental breast. The opening $b'$ in the breast is furnished with a wired hoop, $c$, so as to give it strength and prevent the spreading or enlargement of the opening. A hole, $d$, is punched at the proper place for the spout, the spout being shown detached in Fig. 3 by $d'$.

It is my intention to pack the article thus produced in nests of one-half dozen or more for shipment to distant points, where the local tinners will supply the ears, bail, and cover, and solder in the spout.

The chief feature of my invention is the production of the body and breast in one piece, and the strengthening of the opening in the breast by a wired hoop which prevents the spreading of the corrugations at said opening in the breast, it being seen that the conical inwardly-flaring breast is formed of the upper portion of the body by fluting or corrugating said breast part, so as to bring it inwardly.

If desired, the hoop $c$ may be omitted and a wire worked into the edges of the opening $b'$, as shown in Fig. 5. Fig. 6 is an enlarged view of the hoop $c$ or breast $b$ of Fig. 5, showing the inserted wire.

Tin-plate is preferably used as the material for the body and breast; but copper, brass, or other sheet metal may be used.

Having described my invention, I claim—

1. As a new article of manufacture, a tea-kettle body, A, and breast $b$, made in one piece, the breast being flared inward by corrugation, substantially as set forth.

2. As a new article of manufacture, a tea-kettle body, A, and breast b, made in one piece, the breast being flared inward by corrugation, combined with a strengthening-wire attached to the inner edge of the opening in the breast, substantially as set forth.

3. The body and breast of a tea-kettle made in one piece, having the bead a, and the breast being flared inward by corrugation, combined with the wired hoop c, substantially as set forth.

In testimony whereof I hereunto set my hand and seal.

ISAAC VAN HAGEN. [L. S.]

Witnesses:
G. F. LANAGHEN,
LOUIS M. F. WHITEHEAD.